United States Patent Office 3,525,728
Patented Aug. 25, 1970

3,525,728
POLYMERISATION OF OLEFINS IN THE PRESENCE OF A HOMOGENEOUS CATALYST
Michael John Symes, Sutton, England, assignor to The British Petroleum Company Limited, London, England, a corporation of Great Britain
No Drawing. Filed Dec. 28, 1966, Ser. No. 605,192
Claims priority, application Great Britain, June 6, 1966, 25,096/66
Int. Cl. C08f 3/00
U.S. Cl. 260—93.7
8 Claims

ABSTRACT OF THE DISCLOSURE

Alpha olefins are polymerized between −100° and 200° C. in the liquid phase. A homogeneous catalyst is used which is a solution of the reaction product of an aluminium halide and a halide of a metal of Group VII or VIII.

In an example, 2 g. cobalt chloride and 10 g. aluminium chloride were refluxed in cyclohexane under nitrogen for 24 hours.

100 ml. 4-methylpentene-1 and 50 ml. cyclohexane were cooled to −10° C. 20 ml. of the catalyst solution were added and exotherm to +30° C. occurred. The mixture was cooled and a further 30 ml. of catalyst solution were added producing a similar exotherm. The reaction was terminated after 10 minutes. 50 g. polymer were obtained.

This invention relates to a process for the production of polymers of alpha mono-olefins.

It is known that aluminium chloride as the sole active entity is a polymerisation catalyst useful in the production of high molecular weight polymers, especially at low temperatures. Aluminium chloride is but sparingly soluble in most organic liquids, including polymerisable mono-olefins and polymerisation diluents, such as paraffinic and aromatic hydrocarbons. The solubility of aluminium chloride is so low that even a saturated solution of aluminium chloride is not sufficiently effective as a polymerisation catalyst to be of commercial use unless there is also a reservoir of solid aluminium chloride present. Thus, in general, if aluminium chloride is employed then a heterogeneous polymerisation system results.

Heterogeneous systems are more difficult to control and are less reproducible in activity than homogeneous systems.

It is also known that cobalt chloride, by itself or in the presence of an inert diluent, is inactive insofar as polymerisation is concerned.

We have now discovered that the soluble reaction product of an aluminium halide and a transition metal halide is an effective polymerisation catalyst for alpha mono-olefins.

According to the present invention there is provided a process for the production of polymers of alpha mono-olefins which process comprises polymerising an alpha mono-olefin in the presence of a homogeneous catalyst comprising a reaction product of (a) an aluminium halide and (b) a transition metal halide at a temperature in the range −100° C. to +200° C. and under such conditions of pressure that the reactants are maintained in the liquid or partially condensed phase.

The preferred transition metal halides are those of metals of Groups VII and VIII of the Periodic Table according to Mendeleef. Cobalt halides are particularly preferred.

The preferred compound (a) is aluminium chloride and the preferred compound (b) is cobalt chloride.

Suitable olefins for polymerisation include those containing from 2–6 carbon atoms per molecule.

Preferred olefins are ethylene, propylene and butene-1.

Preferably the pressure under which polymerisation is effected is in the range 200–2000 p.s.i.g. for ethylene, propylene and butene-1.

Pressures as low as atmospheric may be used for the polymerisation of higher olefins, e.g. 3-methylpentene-1 and 4-methylpentene-1.

Polymers ranging from dimers to high molecular weight solid materials may be produced. The nature of the polymer depends on (a) the olefin employed, (b) temperature of reaction and (c) physical factors affecting contact between the catalyst and feed such as time, catalyst concentration, percent conversion, etc. In general, dimers and low molecular weight oligomers are obtained from simple alpha olefins such as ethylene, propylene and butene-1, while branched olefins, such as isobutene, 3-methylpentene-1 and 4-methylpentene-1 give higher polymers of the viscous or semi-solid variety. Dimers of propylene normally contain about 25–35% linear hexenes.

The reaction between the aluminium halide and the transition metal halide is effected by heating them in the presence of a hydrocarbon solvent.

Preferably the aluminium halide is extracted with condensed vapours from a boiling suspension of the transition metal halide in the organic solvent, for example, in a Soxhlet system.

Alternatively, the catalyst may be prepared by refluxing a suspension of both the aluminium halide and the transition metal halide in the solvent.

The advantage of the former method is that resublimation of dry aluminium chloride is unnecessary and relatively strong catalyst solutions can be prepared consistently.

The reaction product in either case is sparingly soluble in the solvent but the resulting solution is an effective polymerisation catalyst.

Suitable solvents are cyclohexane, benzene and chlorobenzene. Heptane and other non-cyclic paraffins are not suitable. Toluene and xylene cannot be used without extensive reaction with aluminium chloride resulting in tarry products.

Excess aluminium chloride should always be present in the catalyst solution. In consequence, the molar ratio Al:Co should always be greater than 2:1. It is believed that in this case the catalyst solution contains the complex Co(AlCl$_4$)$_2$ and free AlCl$_3$.

The catalyst must be preserved from contact with water, oxygen, alcohols, ethers, amines, phosphines, sulphur compounds, dienes, acetylenes, carbon monoxide and other complexing ligands which displace olefins from transition metal complexes and thereby poison the catalyst or inhibit polymerisation.

Since the catalyst is obtained in solution form, no further diluent is necessary for the polymerisation reaction. However, if desired, further solvent may be added as a diluent; alternatively, other inert diluents such as propane, heptane, isooctane, and (provided temperatures below about 40° C. are to be used) toluene and xylene.

The invention is illustrated by the following examples.

EXAMPLE 1

Cobalt chloride (1 g.) and aluminium chloride (5 g.) were heated under refluxing cyclohexane (100 cc.) for 24 hours. Scrupulous care was taken to ensure that the reagents were anhydrous and that the mixture was not exposed to air or moisture. A blue solution was obtained. Part of this solution (47 g.) was transferred under nitrogen to a 1 litre rocking autoclave which was pressurised to 600 p.s.i.g. with liquid propylene. The temperature was maintained at 40° C. for 16 hours. The products were then run off into cooled traps (solid carbon dioxide/acetone). After evaporation of the propylene, 189 g. of a liquid polymer remained which contained 47.5% hexanes, the remainder being higher molecular weight polymer. Of the hexenes, 27.5% was linear hexenes. The catalyst activity was 330 g. polymer/g. cobalt/hour.

EXAMPLE 2

2 g. cobalt chloride and 10 g. aluminium chloride were transferred into a flask and 600 ml. cyclohexane were added, all operations being carried out in a nitrogen atmosphere. The mixture was refluxed under oxygen-free nitrogen for 24 hours. After the mixture had cooled, the solution was filtered off from the undissolved solid material into a dry flask for storage.

The solution was blue in colour and was believed to contain 340 p.p.m. cobalt and 810 p.p.m. aluminium.

100 ml. 4-methylpentene-1 and 50 ml. cyclohexane were placed in a flask and cooled to $-10°$ C. Both had been distilled over potassium before use. 20 ml. of the catalyst solution were added. This produced an exotherm to $+30°$ C. The reaction mixture was cooled to $-10°$ C. and a further 30 ml. of catalyst solution were added, producing a similar effect. 10 minutes after the addition of the second catalyst solution the reaction was terminated by destroying the catalyst with a mixture of methanol and water.

The polymer solution was then washed free from catalyst with water and the solvent was removed on a rotary film evaporator. 50 g. of a sticky, semi-solid polymer were recovered.

EXAMPLE 3

Example 2 was repeated with the difference that 100 ml. 3-methylpentene-1 was employed instead of 100 ml. 4-methylpentene-1. The yield in this case was 40 g. of a sticky, semi-solid polymer.

EXAMPLE 4

Example 3 was repeated with the difference that 50 ml. n-pentane were used as solvent instead of 50 ml. cyclohexane. 33 g. poly-3-methylpentene-1 were recovered in the form of a sticky, semi-solid polymer.

EXAMPLE 5

Resublimed aluminium chloride (14 g.) was placed in the thimble of a standard Soxhlet extraction apparatus. Cobalt chloride (5 g.) which had been dried under vacuum for 6 hours at 120° C. and benzene (1 litre), which had previously been distilled off potassium and stored in contact with sodium wire under an atmosphere of nitrogen, were placed in the flask and heated for 15 hours while the benzene refluxed, the condensate passing through the aluminium chloride bed. Care was taken to ensure that oxygen and moisture were absent from the apparatus. A green solution was obtained which contained 1300 p.p.m. cobalt and 2300 p.p.m. aluminium. Part of this solution (57 g.) was transferred under dry nitrogen to a 1-litre autoclave. The autoclave was pressurised with pure liquid propylene at 620 p.s.i. and rocked for 3 hours. The temperature was initially 40° C. but due to the exothermic nature of the polymerisation reaction rose to 98° C. at one time. Products were vented off into chilled (carbon dioxide/acetone) traps. After evaporation of unconverted propylene at room temperature the product consisted of 145 g. liquid polymer in addition to the original catalyst solution.

EXAMPLE 6

The catalyst was prepared substantially as described in Example 5, but using 5 g. cobalt chloride and 400 cc. purified cyclohexane. The sublimed aluminium chloride (10 g.) was a commercial sample and was used without resublimation. After refluxing for 15 hours the resulting blue solution contained 900 p.p.m. cobalt and 3100 p.p.m. aluminium. Part of this solution (22.0 g.) was used for propylene polymerisation as in Example 5 at 40° C. and 680 p.s.i. for 20 hours. The product consisted of 147 g. liquid polymer.

EXAMPLE 7

Cobalt chloride (1 g.) dried at 120° C./5 mm. mercury/4 hours, resublimed aluminium chloride (5 g.) and 200 cc. chlorobenzene, which had been redistilled under nitrogen and stored over activated molecular sieve, were mixed and heated under reflux for 15 hours. The usual precautions were taken to ensure the absence of oxygen and moisture from the atmosphere. A yellow solution was obtained. Part of this solution (75 g.) was used for propylene polymerisation at 40° C./760 p.s.i. for 24½ hours as in Example 5. The yield of liquid polymer was 142 g.

EXAMPLE 8

Cobalt bromide (1 g.) dried at 120° C./5 mm. mercury/5 hours, resublimed aluminium chloride (5 g.) and purified cyclohexane (300 cc.) were heated under reflux for 15 hours in the absence of air and moisture. The resulting solution was greenish-blue. Part of this solution (56 g.) was used for propylene polymerisation as in Example 5 at 40° C./760 p.s.i. for 23 hours. The product consisted of 18 g. liquid polymer.

EXAMPLE 9

Dry nickel chloride (2 g.), resublimed aluminium chloride (5 g.) and pure benzene (200 cc.) were heated under reflux in an atmosphere of dry nitrogen for 15 hours. The resulting solution was green and contained 130 p.p.m. nickel and 900 p.p.m. aluminium. Part of the solution (28 g.) was used for propylene polymerisation as in Example 5 at 40° C./600 p.s.i. for 17.5 hours. Liquid polymer totalling 201 g. was obtained of which 16% was hexene.

EXAMPLE 10

Manganese (II) chloride (5 g.) dried under vacuum at 120 C./8 hours, resublimed aluminium chloride (5 g.) and purified benzene (200 cc.) were heated under reflux for 15 hours in an atmosphere of dry nitrogen. A dark brown solution was obtained. Part of this solution (59 g.) was used for propylene polymerisation as described in Example 5 at 40° C.–49°C./670 p.s.i. for 22 hours. The yield of liquid polymer was 228 g.

EXAMPLE 11

Isobutene (99°) (100 ml.) and n-pentane (150 ml.), both of which had been dried previously, were transferred to the reactor flask under nitrogen and chilled to $-10°$ C. $CoCl_2/AlCl_3$/benzene catalyst solution was then added slowly over a 20 minute period, during which time the reaction temperature was kept at $-10°$ C. The catalyst solution contained 1100 p.p.m. cobalt and 2700 p.p.m. aluminium. The reaction was terminated with a methanol/water mixture after the addition of catalyst solution was completed. The polymer solution was washed free of catalyst residues after which the solvent was removed on a rotary film evaporator. 58 g. of semisolid polymer was recovered which had a kinematic viscosity at 210° F. of 6700 cs.

EXAMPLE 12

Butadiene raffinate (51% isobutene the remainder mainly butene-2 with some butene-1) (200 ml./h.) and $AlCl_3/CoCl_2$/benzene catalyst solution (25 ml./h.) were pumped continuously into a reactor of 56 ml. capacity. The catalyst solution contained 1200 p.p.m. cobalt and 1800 p.p.m. aluminium. The reactor was under a pressure of 25 p.s.i.g. and the reaction temperature was maintained at 20° C. Polymer solution was taken off continuously from the reactor. The polymer solution was then washed and the solvent was removed on a rotary film evaporator. The polymer product was obtained, in 70% (on isobutene) yield, as a viscous liquid which had a kinematic viscosity of 92 cs. at 210° F.

What I claim is:

1. A process for the production of polymers of alpha mono-olefins, which process comprises polymerising an alpha mono-olefin in the presence of a homogeneous catalyst system comprising a reaction product of (a) an excess of an aluminium halide and (b) a transition metal halide at a temperature in the range $-100°$ C. to $+200°$ C. and under such conditions of pressure that the reactants are maintained in the liquid or partially condensed phase, said transition metal being a halide of a metal of Groups VVII or VVIII of the Periodic Table according to Mendeleef.

2. A process according to claim 1 wherein the transition metal halide is a cobalt halide.

3. A process according to claim 2 wherein the catalyst is the reaction product of aluminium chloride and cobalt chloride.

4. A process according to claim 1 wherein the alpha olefin contains from 2 to 6 carbon atoms per molecule.

5. A process according to claim 4 wherein the alpha olefin is ethylene, propylene or butene-1.

6. A process according to claim 5 wherein the pressure under which polymerisation is effected is in the range 200–2000 p.s.i.g.

7. A process according to claim 1 wherein the alpha olefin is 3-methylpentene-1 or 4-methylpentene-1.

8. A process according to claim 7 wherein the pressure under wihch polymerisation is effected is atmospheric.

References Cited
UNITED STATES PATENTS

| | | | |
|---|---|---|---|
| 2,970,133 | 1/1961 | Sistrunk | 260—93.7 |
| 3,049,526 | 8/1962 | D'Alelio | 260—93.7 |
| 3,236,826 | 2/1966 | Scott | 260—94.3 |

JOSEPH L. SCHOFER, Primary Examiner

R. A. GAITHER, Assistant Examiner

U.S. Cl. X.R.

260—94.8, 683.15, 94.9

PO-1050
(5/69)

UNITED STATES PATENT OFFICE
CERTIFICATE OF CORRECTION

Patent No. 3,525,728                     Dated   August 25, 1970

Inventor(s)   Michael John Symes

It is certified that error appears in the above-identified patent and that said Letters Patent are hereby corrected as shown below:

Column 5, line 7, "VVII or VVIII" should read -- VII or VIII --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents